(12) United States Patent
Ashihara et al.

(10) Patent No.: US 10,851,227 B2
(45) Date of Patent: Dec. 1, 2020

(54) RESIN COMPOSITION, INSULATED ELECTRIC WIRE AND METHOD OF MANUFACTURING INSULATED ELECTRIC WIRE

(71) Applicant: Hitachi Metals, Ltd., Tokyo (JP)

(72) Inventors: Shingo Ashihara, Tokyo (JP); Hirotaka Yasaki, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/844,516

(22) Filed: Apr. 9, 2020

(65) Prior Publication Data

US 2020/0332100 A1 Oct. 22, 2020

(30) Foreign Application Priority Data

Apr. 18, 2019 (JP) ................................. 2019-079276
Dec. 25, 2019 (JP) ................................. 2019-233953

(51) Int. Cl.
*C08L 23/08* (2006.01)
*H01B 3/44* (2006.01)
*H01B 7/02* (2006.01)
*C08K 3/22* (2006.01)
*C08K 9/04* (2006.01)
*C08K 3/013* (2018.01)

(52) U.S. Cl.
CPC ....... *C08L 23/0853* (2013.01); *C08L 23/0815* (2013.01); *H01B 3/446* (2013.01); *H01B 7/0275* (2013.01); *C08K 3/013* (2018.01); *C08K 9/04* (2013.01); *C08K 2003/2227* (2013.01); *C08L 2203/202* (2013.01); *C08L 2205/02* (2013.01)

(58) Field of Classification Search
CPC ... H01B 3/446; H01B 7/0275; C08L 23/0853; C08L 23/0815; C08K 3/22; C08K 2003/2227; C08K 2003/2224
See application file for complete search history.

(56) References Cited

U.S. PATENT DOCUMENTS 9,991,027 B2 * 6/2018 Kibe ..................... H01B 7/04
9,997,280 B2 * 6/2018 Nakamura ............. H01B 7/295
10,497,489 B2 * 12/2019 Iwasaki .................. H01B 3/448
(Continued)

FOREIGN PATENT DOCUMENTS

JP 2013216866 A 10/2013

*Primary Examiner* — Timothy J Thompson
*Assistant Examiner* — Amol H Patel
(74) *Attorney, Agent, or Firm* — McCormick, Paulding & Huber PLLC

(57) ABSTRACT

An insulated electric wire includes a conductor and an insulating layer. This insulating layer is made of a resin composition containing a base polymer and a metallic hydroxide. The base polymer contains ethylene-vinyl acetate copolymer and ethylene-($\alpha$-olefin) copolymer. The "$\alpha$-olefin" is a non-polarized monomer, its melting point is equal to or lower than 70° C. A vinyl-acetate total content of the base polymer is equal to or less than 19 mass %. The resin composition contains the ethylene-($\alpha$-olefin) copolymer, a content of which is equal to or more than 20 parts by mass and equal to or less than 70 parts by mass per 100 parts by mass of the base polymer, and contains the metallic hydroxide, a content of which is equal to or more than 30 parts by mass and equal to or less than 150 parts by mass per 100 parts by mass of the base polymer.

13 Claims, 1 Drawing Sheet

(56) References Cited

U.S. PATENT DOCUMENTS

Figure 1:
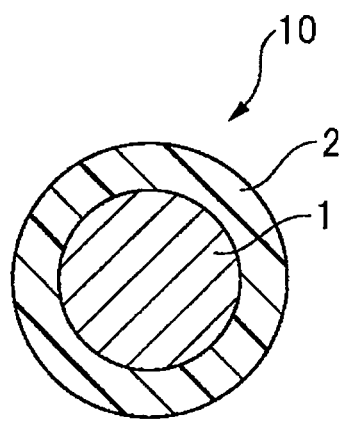

| | | | | |
|---|---|---|---|---|
| 2009/0114417 A1* | 5/2009 | Nakayama | ............ | H01B 3/447 |
| | | | | 174/110 SR |
| 2012/0318557 A1* | 12/2012 | Iwasaki | ............... | C08K 5/0025 |
| | | | | 174/113 C |
| 2013/0240239 A1* | 9/2013 | Kimura | .................. | C09K 21/14 |
| | | | | 174/110 S |
| 2014/0030520 A1* | 1/2014 | Nakamura | .......... | C08L 23/0815 |
| | | | | 428/368 |
| 2014/0083738 A1* | 3/2014 | Segawa | .................. | H01B 7/295 |
| | | | | 174/120 C |
| 2014/0141240 A1* | 5/2014 | Segawa | .................... | C08K 3/22 |
| | | | | 428/375 |
| 2014/0141241 A1* | 5/2014 | Nishi | .................. | C08L 23/0815 |
| | | | | 428/379 |
| 2019/0178423 A1* | 6/2019 | Blondel | .................. | F25B 13/00 |
| 2019/0345391 A1* | 11/2019 | Nishiguchi | ............ | C08L 101/00 |
| 2019/0358928 A1* | 11/2019 | Kikuchi | .................... | B32B 1/08 |

\* cited by examiner

RESIN COMPOSITION, INSULATED ELECTRIC WIRE AND METHOD OF MANUFACTURING INSULATED ELECTRIC WIRE

CROSS-REFERENCE TO RELATED APPLICATION

The present application claims priority from Japanese Patent Application No. 2019-079276 filed on Apr. 18, 2019, and Japanese Patent Application No. 2019-233953 filed on Dec. 25, 2019, the contents of which are hereby incorporated by reference into this application.

TECHNICAL FIELD OF THE INVENTION

The present invention relates to a resin composition, an insulated electric wire and a method of manufacturing the insulated electric wire.

BACKGROUND OF THE INVENTION

An insulated electric wire (electric wire) includes a conductor and an insulating layer (coating substance) arranged in periphery of the conductor. This insulating layer is made of a resin composition (electrically-insulating material) containing rubber or resin as a main raw material. In recent years, in consideration of environmental problems, insulated electric wires each having an insulating layer made of a non-halogen resin composition not containing a halogen element such as fluorine, chlorine and bromine that have a risk of occurrence of toxic gas at the time of burning have been widely used. It is preferable to use such an insulated electric wire as an in-board wiring of a distribution board/control board or a motor lead wire having a relatively high possibility of person's touching behavior.

As a base polymer of the non-halogen resin composition, ethylene-vinyl acetate copolymer having high flexibility and being relatively inexpensive is widely used. The non-halogen resin composition generally has a low flame retardancy, and therefore, is often used so that a frame retardant is added thereto.

For example, a Japanese Patent Application Laid-Open Publication No. 2013-216866 (Patent Document 1) descries a non-halogen resin composition obtained by mixture of metallic hydroxide or others with a base polymer containing the ethylene-vinyl acetate copolymer as such a non-halogen resin composition, and describes an insulated electric wire or others having an insulating layer made of this non-halogen resin composition.

SUMMARY OF THE INVENTION

Here, matters about the base polymer containing the ethylene-vinyl acetate copolymer and the non-halogen resin composition containing the metallic hydroxide (simply referred to as "resin composition" below) studied by the present inventors will be described. Generally, for providing the insulating layer of the insulated electric wire with properties such as strength, flexibility (bendability) and heat resistance, a cross-link step that chemically couples molecules contained in a resin composition is necessary. As a cross linking method of the resin composition in the cross-link step, for example, an electron-beam irradiation method and a chemical cross linking method are exemplified. Particularly, the electron-beam irradiation method is applicable to cross linkage for almost all resin compositions, and can also relatively simplify a blend composition of the resin composition, and therefore, is preferable.

However, generally, the resin composition that has been cross-linked by the electron-beam irradiation method has a lower degree of the cross linkage than that of the resin composition that has been cross-linked by the chemical cross linking method. In the electron-beam irradiation method, the insulated electric wire is irradiated with the electron beam under a room temperature in most cases, and therefore, a surface temperature of the insulating layer is about 25 to 100° C. This temperature is a temperature that is lower than or around a melting point of each raw material of the resin composition configuring the insulating layer, and therefore, it is considered that fluidity of the resin composition in the cross-link step is low (it is difficult to generate molecular motion), which results in a low cross-linkage efficiency. Particularly when the raw materials of the resin composition include a resin containing a lot of crystal components and having a high melting point, significant reduction in the cross-linkage efficiency is observed.

In order to solve such a problem, the present inventors have studied that the resin composition is made of a resin having a low melting point. When the resin composition is made of a resin having a low melting point, the fluidity of the resin composition at the time of the electron-beam irradiation is increased, so that the degree of the cross linkage can be increased. However, when the resin composition is made of the resin having the low melting point, the resin composition becomes too soft, and crush resistance of the insulating layer made of the resin composition is decreased.

Particularly when the electron-beam irradiation method is applied, generally, the insulated electric wire is tentatively reeled up onto a drum after an insulating-layer coating step, and then, the insulated electric wire is reeled out of the drum in a different step, and this insulated electric wire is irradiated with the electron beam. When the resin composition is too soft, a connect portion between the electric wires is crushed since the uncross-linked insulated electric wire is reeled up onto the drum, which results in a problem of deterioration of appearance of the insulated electric wire.

For the resin composition making up the insulating layer of the insulated electric wire, it is also essential to secure flame retardancy and flexibility as the insulating layer of the insulated electric wire that is necessary for application in, for example, an in-board wiring of a distribution board/control board, a motor lead wire or others.

The present invention has been made in consideration of such problems, and a purpose of the present invention is to provide a resin composition and an insulated electric wire, each of which has both an improved crush resistance in an uncross-linked state and an improved degree of cross linkage at the time of cross linkage.

The summary of the typical aspects of the inventions disclosed in the present application will be briefly described as follows.

[1] A resin composition contains a base polymer and a metallic hydroxide. The base polymer contains at least ethylene-vinyl acetate copolymer and ethylene-(α-olefin) copolymer. The "α-olefin" that is a raw material of the ethylene-(α-olefin) copolymer is a non-polarized monomer, a melting point of the ethylene-(α-olefin) copolymer is equal to or lower than 70° C., and a vinyl-acetate total content of the non-polarized base polymer is equal to or less than 19 mass %. The resin composition contains the ethylene-(α-olefin) copolymer, a content of which is equal to or more than 20 parts by mass and equal to or less than 70 parts by mass per 100 parts by mass of the base polymer, and the resin composition contains the metallic hydroxide, a content of which is equal to or more than 30 parts by mass and equal to or less than 150 parts by mass per 100 parts by mass of the base polymer.

[2] In the resin composition described in the item [1], the metallic hydroxide is aluminum hydroxide.

[3] In the resin composition described in the item [2], a surface of the aluminum hydroxide is treated with a fatty acid.

[4] In the resin composition described in the item [2], the resin composition contains the aluminum hydroxide, a content of which is equal to or more than 50 parts by mass and equal to or less than 100 parts by mass per 100 parts by mass of the base polymer.

[5] In the resin composition described in the item [1], the α-olefin is 1-butene or 1-octene.

[6] In the resin composition described in the item [1], the resin composition contains the ethylene-(α-olefin) copolymer, a content of which is equal to or more than 30 parts by mass and equal to or less than 50 parts by mass per 100 parts by mass of the base polymer.

[7] In the resin composition described in the item [1], the resin composition further contains a black pigment, a white pigment, a red pigment, a yellow pigment or a green pigment.

[8] An insulated electric wire including an insulating layer made of the resin composition described in any one of the items [1] to [7].

[9] A cable including a sheath layer made of the resin composition described in any one of the items [1] to [7].

[10] In the insulated electric wire described in the item [8], the resin composition further contains a heavy metal deactivator, and the insulating layer is in contact with the conductor.

[11] The insulated electric wire described in the item [8] is used as an in-board wiring of a distribution board/control board or a motor lead wire.

[12] A method of manufacturing an insulated electric wire includes a step (a) of forming a resin composition by kneading a base polymer and a metallic hydroxide, a step (b) of manufacturing an uncross-linked insulated electric wire by extruding the resin composition so as to coat periphery of a conductor to form an insulating layer, and a step (c) of manufacturing a cross-linked insulated electric wire by irradiating the uncross-linked insulated electric wire with electron beam to cross-link the base polymer in the resin composition. The base polymer contains at least ethylene-vinyl acetate copolymer and ethylene-(α-olefin) copolymer. The "α-olefin" that is a raw material of the ethylene-(α-olefin) copolymer is a non-polarized monomer, a melting point of the ethylene-(α-olefin) copolymer is equal to or lower than 70° C., and a vinyl-acetate total content of the base polymer is equal to or less than 19 mass %. The resin composition contains the ethylene-(α-olefin) copolymer, a content of which is equal to or more than 20 parts by mass and equal to or less than 70 parts by mass per 100 parts by mass of the base polymer, and the resin composition contains the metallic hydroxide, a content of which is equal to or more than 30 parts by mass and equal to or less than 150 parts by mass per 100 parts by mass of the base polymer.

[13] The method of manufacturing the insulated electric wire described in the item [12] includes a step (d) of reeling up the uncross-linked insulated electric wire after the step (b) and before the step (c).

The present invention can provide a resin composition and an insulated electric wire, each of which has both an improved crush resistance in an uncross-linked state and an improved degree of cross linkage at the time of cross linkage.

BRIEF DESCRIPTIONS OF THE DRAWINGS

Figure 2:
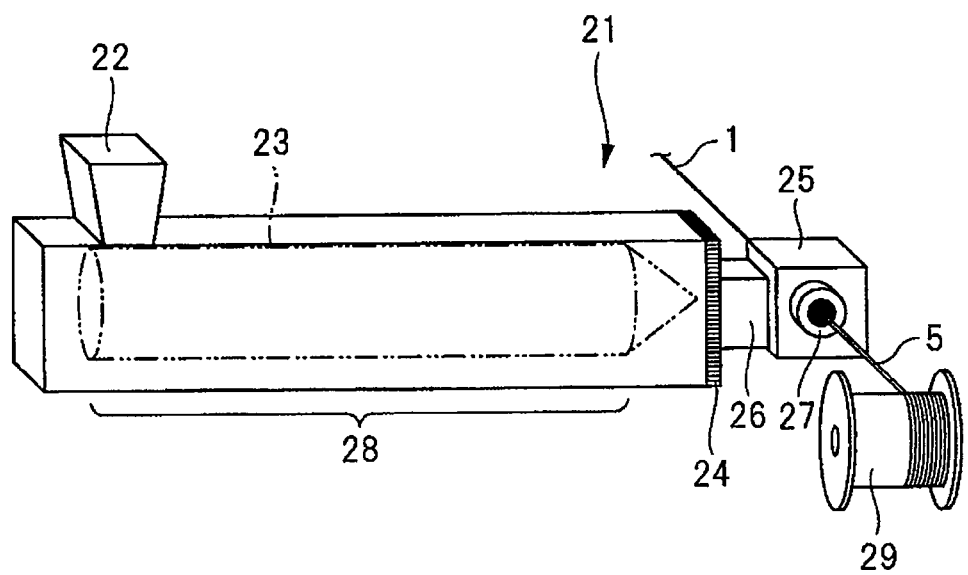

FIG. 1 is a horizontal cross-sectional view showing a structure of an insulated electric wire of an embodiment; and FIG. 2 is a schematic view showing an extrusion coating apparatus that manufactures the insulated electric wire of the embodiment.

DESCRIPTIONS OF THE PREFERRED EMBODIMENTS

Embodiment

<Configuration of Resin Composition>

A resin composition (non-halogen resin composition, flame-retardant resin composition) according to an embodiment of the present invention contains (A) a base polymer and (B) a flame retardant (metallic hydroxide). The (A) base polymer contains (A1) ethylene-vinyl acetate copolymer and (A2) ethylene-(α-olefin) copolymer.

As (A1) the ethylene-vinyl acetate copolymer of the present embodiment, individual use of the ethylene-vinyl acetate copolymer may be applied. However, two or more types of the ethylene-vinyl acetate copolymers having different vinyl acetate contents (VA amount) from one another may be blended. In working examples described later, ethylene-vinyl acetate copolymer having a vinyl acetate content (VA amount) of 20 mass % and ethylene-vinyl acetate copolymer having a vinyl acetate content (VA amount) of 33 mass % are used. As described later, in the present embodiment, control for a vinyl-acetate total content in the base polymer is important while a vinyl-acetate content of the ethylene-vinyl acetate copolymer itself is not particularly limited.

The α-olefin that is a raw material of (A2) the ethylene-(α-olefin) copolymer of the present embodiment is a non-polarized monomer. As the α-olefin that is the raw material of the ethylene-(α-olefin) copolymer, for example, propylene, 1-butene, 1-pentene, 1-hexene, 1-heptene, 1-octene, 4-methyl-1-pentene and others are exemplified, and 1-butene or 1-octene is preferable.

A melting point of (A2) the ethylene-(α-olefin) copolymer of the present embodiment is equal to or lower than 70° C. In this case, the melting point of the ethylene-(α-olefin) copolymer was obtained by heat quantity measurement using differential scanning calorimetry (DSC). That is, the fact that the melting point is equal to or lower than 70° C. implies that a region that is equal to or lower than 70° C. has a crystalline melting peak in the heat quantity measurement using the differential scanning calorimetry. When (A2) an ethylene-(α-olefin) copolymer having a melting point that is higher than 70° C. is used as described later in the working examples, a sufficient degree of the cross linkage cannot be obtained.

The (A) base polymer of the present embodiment may contain a different polymer in addition to (A1) the ethylene-vinyl acetate copolymer and (A2) the ethylene-(α-olefin) copolymer. For example, in order to improve the crush resistance, it is preferable to add polypropylene or polyethylene to (A) the base polymer, and the added different polymer is preferably a non-polarized polymer in order not to decrease the electrical insulation property.

The (B) flame retardant of the present embodiment is a metallic hydroxide, and, for example, aluminum hydroxide or a magnesium hydroxide is exemplified. In a viewpoint of suppression of deliquescent phenomenon that is possibly caused by reaction with nitride oxide or sulfur oxide, it is preferable to use the aluminum hydroxide as (B) the flame retardant. Either (B11) an aluminum hydroxide, a surface of which is treated with a fatty acid or (B12) an aluminum hydroxide, a surface of which is untreated, may be used as (B1) the aluminum hydroxide. However, since affinity with the base polymer and dispersibility are improved by the surface treatment with the fatty acid to improve the flame retardancy of the resin composition or others, and therefore, the aluminum hydroxide, a surface of which is treated, is better than the aluminum hydroxide, a surface of which is untreated.

As the fatty acid used for the surface treatment, a higher fatty acid having a carbon number of about 10 may be used, regardless of whether the fatty acid is a saturated one or an unsaturated one. As specific examples of the fatty acid used for the surface treatment, if it is a higher saturated fatty acid, lauric acid, palmitic acid, stearic acid and arachidic acid are exemplified. Alternatively, if it is a higher unsaturated fatty acid, mono-unsaturated fatty acid such as oleic acid, myristoleic acid, palmitoleic acid and eicosenoic acid, di-unsaturated fatty acid such as linoleic acid, tri-unsaturated fatty acid such as linolenic acid are exemplified. Among these materials, the stearic acid or the oleic acid has versatility, and is preferable. As the surface treatment agent, individual or combination use of these fatty acids is possible.

The resin composition of the present embodiment may contain not only (A) the base polymer and (B) the flame retardant but also (C) cross linking aid, (D) antioxidant, (E) copper inhibitor, (F) lubricant, (G) colorant or others if needed.

As (C) the cross linking aid, for example, trimethylol propane trimethacrylate (TMPT), triallyl isocyanurate, triallyl cyanurate, N, N'-meta phenylene bis maleimide, ethylene glycol dimethacrylate, zinc acrylate, zinc methacrylate and others are exemplified.

As (D) the antioxidant, for example, phenol-based antioxidant, sulfur-based antioxidant, phenol/thioester-based antioxidant, amine-based antioxidant, phosphorous ester-based antioxidant and others are exemplified.

As (E) the copper inhibitor (heavy metal deactivator), any material is applicable as long as forming a complex with a copper ion, and, for example, N, N'-bis[3-(3, 5-di-tert-butyl-4-hydroxyphenyl) propionyl] hydrazine (CAS No. 32687-78-8), 3-(N-salicyloyl) amino-1, 2, 4-triazole (CAS No. 36411-52-6), N'1, N'12-bis(2-hydroxybenzoyl) dodecane dihydrazide (CAS No. 63245-38-5) and others are exemplified. Any of individual use of these materials, mixture of the same with a different compound, and masterbatched material (for example, kneaded into a resin at a high concentration) may be applicable.

As (F) the lubricant, for example, fatty acid amide system, zinc stearate, silicone, hydrocarbon system, ester system, alcohol system, metal soap system and others are exemplified. As (G) the colorant, for example, carbon black, inorganic pigment, organic pigment, dye and others are exemplified.

As described later in the working examples, the resin composition of the present embodiment contains (A2) the ethylene-(α-olefin) copolymer having the melting point that is equal to or lower than 70° C., a content of which is equal to or more than 20 parts by mass and equal to or less than 70 parts by mass per 100 parts by mass of (A) the base polymer. When the addition amount of (A2) the ethylene-(α-olefin) copolymer having the melting point that is equal to or lower than 70° C. is less than 20 parts by mass per 100 parts by mass of (A) the base polymer, the sufficient degree of the cross linkage cannot be obtained. On the other hand, when the addition amount of (A2) the ethylene-(α-olefin) copolymer having the melting point that is equal to or lower than 70° C. is more than 70 parts by mass per 100 parts by mass of (A) the base polymer, the sufficient crush resistance cannot be obtained. In a viewpoint of both achievement of the improved degree of the cross linkage and the improved crush resistance, the resin composition of the present embodiment preferably contains (A2) the ethylene-(α-olefin) copolymer, a content of which is equal to or more than 30 parts by mass and equal to or less than 50 parts by mass per 100 parts by mass of (A) the base polymer.

In the present embodiment, the vinyl-acetate total content in (A) the base polymer is equal to or less than 19 mass %. In this case, the vinyl-acetate total content (total VA amount) in (A) the base polymer is expressed by the following expression.

$$\text{Total VA Amount} = \Sigma Xi \times Yi \ (i=1,2,\ldots,k)$$

In this case, "Xi" represents a vinyl-acetate content (mass %) of (A1) the ethylene-vinyl acetate copolymer in (A) the base polymer, "Yi" represents a ratio (in mass) of (A1) the ethylene-vinyl acetate copolymer in (A) the base polymer, and "k" represents the number of types of (A1) the ethylene-vinyl acetate copolymer added to (A) the base polymer (for example, "k=1" when the number of types is one, and "k=2" when the number of types is two). As a specific example, in a case of a working example 6 described later, (A1) the ethylene-vinyl acetate copolymer contains two types that are (A11) an ethylene-vinyl acetate copolymer having a vinyl-acetate content of 20 mass % and (A12) an ethylene-vinyl acetate copolymer having a vinyl-acetate content of 33 mass %, and therefore, the total VA amount is obtained to be 16.6 mass % by the following expression.

$$\text{Total VA Amount} = 20 \text{ mass \%} \times 50/100 + 33 \text{ mass \%} \times 20/100 = 16.6 \text{ mass \%}$$

In the present embodiment, when the vinyl-acetate total content in (A) the base polymer is more than 19 mass %, an electric insulation property that is sufficient for a general insulated electric wire cannot be obtained, and besides, there is a risk of deterioration of handleability of the resin composition and the insulate electric wire using the resin composition as the insulating layer due to surface stickiness of the resin composition and increase in acetic acid odor.

The resin composition of the present embodiment contains (B) the metallic hydroxide, a content of which is equal to or more than 30 parts by mass and equal to or less than 150 parts by mass per 100 parts by mass of (A) the base polymer. When the addition amount of (B) the metallic hydroxide is less than 30 parts by mass per 100 parts by mass of (A) the base polymer, the sufficient flame retardancy cannot be obtained. On the other hand, when the addition amount of (B) the metallic hydroxide is more than 150 parts by mass per 100 parts by mass of (A) the base polymer, the sufficient tensile property and electric insulation property cannot be obtained. In a viewpoint of achievement of all the flame retardancy, the tensile property and the electric insulation property, the resin composition of the present embodiment preferably contains (B) the metallic hydroxide, a content of which is equal to or more than 50 parts by mass and equal to or less than 100 parts by mass per 100 parts by mass of (A) the base polymer.

The resin composition according to an embodiment of the present invention is preferably a non-halogen resin composition not containing a halogen element.

The resin composition of the present embodiment described above is favorably applicable as a material of the insulating layer of the insulated electric wire 10 shown in FIG. 1 (a sheath layer in a case of a cable) manufactured in manufacturing steps including a step of applying an external force such as a load, bending and friction on the uncross-linked insulated electric wire 5, such as a step of reeling up the uncross-linked insulated electric wire 5 shown in FIG. 2 onto the drum or others before the cross linkage.

<Configuration of Insulated Electric Wire>

FIG. 1 is a horizontal cross-sectional view showing the insulated electric wire (electric wire) according to the embodiment of the present invention. As shown in FIG. 1, an insulated electric wire 10 according to the present embodiment includes a conductor 1 and an insulating layer 2 arranged in periphery of the conductor 1. The insulating layer 2 is made of the resin composition of the present embodiment.

As the conductor 1, a generally-used metallic wire such as a copper wire and a copper alloy wire, and besides, an aluminum wire, a gold wire and a silver wire, can be used. Alternatively, as the conductor 1, a metallic wire, periphery of which is plated with a metal such as tin and nickel, may be used. Further, as the conductor 1, a stranded conductor formed by intertwining metallic wires may be also used.

The case of the insulated electric wire 10 having the single insulating layer 2 in the present embodiment has been described as the example. However, the present invention is also applicable to a cable having a sheath layer formed outside the insulating layer. In this case, in a viewpoint of improvement of the crush resistance (prevention of being scratched) in the manufacturing steps of the cable, at least the sheath layer that is an outermost layer (a top layer) is preferable to be made of the resin composition of the present embodiment.

The insulated electric wire 10 of the present embodiment is applicable in various intended uses and various sizes, and can be used for each electric wire for use in a railroad vehicle, a car, an in-board wiring, an in-device wiring, and electricity.

Particularly, even addition of, for example, a black pigment, a white pigment, a red pigment, a yellow pigment or a green pigment as (G) the colorant to the resin composition making up the insulating layer 2 of the present embodiment as described later in working examples does not affect the crush resistance and the degree of the cross linkage. Therefore, the present embodiment can provide the insulated electric wire 10 that is distinguishable on the basis of hue such as a black color, a white color, a red color, a yellow color or a green color. The insulated electric wire 10 of the present embodiment is effective to be used as an in-board wiring of a distribution board/control board or a motor lead wire, which has a small (thin) outer diameter and many of which are wired in a narrow space, and besides, effective to an intended use that needs a wiring operability in a narrow space (narrow-space wiring capability) and effective as an electric wire having high possibility of person's direct touching behavior.

As shown in FIG. 1, in the insulated electric wire 10 of the present embodiment, it is preferable not to arrange a separator between the conductor 1 and the insulating layer 2 in a viewpoint of reduction in a manufacturing cost and increase in efficiency of a wiring operation (securement of flexibility), but preferable to bring the insulating layer 2 to be in contact with the conductor 1 (to provide a separator-less state), although the present invention is not limited to this. However, when the insulated electric wire 10 is in the separator-less state, the copper ion is diffused in some cases from the conductor 1 into the resin composition making up the insulating layer 2 by heat generation from the conductor 1 at the time of energization. In this case, by addition of the above-described (E) copper inhibitor (heavy metal deactivator) to the resin composition making up the insulating layer 2, the diffused copper ion is captured by (E) the copper inhibitor, so that the resin composition can be prevented from deteriorating.

<Method of Manufacturing Insulated Electric Wire>

First, an apparatus that manufactures the insulated electric wire of the present embodiment will be described. FIG. 2 is a schematic view showing an extrusion coating apparatus that manufactures the insulated electric wire of the embodiment or the present invention.

An extrusion coating apparatus 21 according to the present embodiment is, for example, a single screw extruder (L/D=20) having a screw diameter of 65 mm. The extrusion coating apparatus 21 includes a hopper 22 that loads a pellet of the resin composition, a cylinder 28 that heats the resin composition, a screw 23 that extrudes the resin composition in the cylinder 28, and a breaker plate 24 that regulates flow of the resin composition to increase a back pressure for improving a kneading state. Further, the extrusion coating apparatus 21 includes a head 25 that applies the resin composition onto the periphery of the conductor 1, a neck 26 that connects the cylinder 28 and the head 25, and a die 27 that defines a diameter of the electric wire. The screw 23 has a full flight shape. The cylinder 28 is divided into five cylinders, and is referred to below as cylinders 1 to 5 (not illustrated, see FIG. 1) as counted in an order from the hopper 22 side.

An electron-beam irradiation apparatus according to the present embodiment includes an electron-beam irradiation unit and a pulley for use in guiding the insulated electric wire (illustration of the electron-beam irradiation apparatus is omitted).

Next, a method of manufacturing the insulated electric wire 10 of the present embodiment will be described. The method of manufacturing the insulated electric wire 10 of the present embodiment includes two manufacturing methods of a first embodiment and a second embodiment described below.

First, the method of manufacturing the insulated electric wire 10 according to the first embodiment will be described. For example, (A) the base polymer and (B) the flame retardant are kneaded by a kneader, and, for example, a pellet-shaped resin composition (compound) is formed (at a kneading step (a1)).

After the kneading step (a1) and before an insulating-layer coating step (b1), the method of manufacturing the insulated electric wire 10 according to the first embodiment is preferable to include a step (f) (conductor heating step) of heating the conductor 1 at a temperature that is equal to or higher than the melting point of (A2) the ethylene-($\alpha$-olefin) copolymer and being equal to or lower than a setting temperature at the time of the extrusion of the resin composition in the kneading step (a1) (A reason of this will be described later, and the same goes for the second embodiment).

Subsequently, by the extrusion coating apparatus 21 shown in FIG. 2, for example, the pellet of the resin composition is loaded into the hopper 22. Then, the resin composition is extruded so as to coat the periphery of the conductor 1 to form the insulating layer 2 having a predetermined thickness (at the insulating-layer coating step (b1)). In this manner, an uncross-linked insulated electric wire 5 is manufactured.

Note that the first embodiment includes a step (d) of reeling up the uncross-linked insulated electric wire 5 after the insulating-layer coating step (b1) and before a cross-linking step (c1) although this step is not always needed. In this case, the manufactured uncross-linked insulated electric wire 5 is temporarily housed so that the insulated electric wire is reeled up onto the drum 29.

Subsequently, the uncross-linked insulated electric wire 5 is reeled out of the drum 29 by the electron-beam irradiation apparatus, and is guided and loaded into the electron-beam irradiation unit by the pulley. Then, in the electron-beam irradiation unit, the uncross-linked insulated electric wire 5 is irradiated with electron beams (at the cross-linking step (c1)). In this manner, (A) the base polymer in the resin composition making up the insulating layer 2 of the uncross-linked insulated electric wire 5 is cross-linked, so that a cross-linked insulated electric wire 10 can be manufactured. Note that the cross-linked insulated electric wire 10 is, for example, guided by the pulley and reeled up onto the drum and housed although this step is not always needed. By the above-described steps, the insulated electric wire 10 of the present embodiment shown in FIG. 1 can be manufactured.

The kneading apparatus for use in manufacturing the resin composition of the present embodiment is not limited to the kneader, and a publicly-known kneading apparatus such as a batch-type kneader such as a Banbury mixer or a continuous-type kneader such as a twin-screw extruder can be adopted.

<Feature and Effect of Resin Composition and Insulated Electric Wire of Present Embodiment>

The resin composition according to the embodiment of the present invention contains (A) the base polymer and (B) the metallic hydroxide (flame retardant). The (A) base polymer contains at least (A1) the ethylene-vinyl acetate copolymer and (A2) the ethylene-(α-olefin) copolymer having the melting point that is equal or lower than 70° C. The "α-olefin" that is a raw material of (A2) the ethylene-(α-olefin) copolymer is a non-polarized monomer. The vinyl-acetate total content of (A) the base polymer is equal to or less than 19 mass %. The resin composition of the present embodiment contains (A2) the ethylene-(α-olefin) copolymer having the melting point that is equal or lower than 70° C., a content of which is equal to or more than 20 parts by mass and equal to or less than 70 parts by mass per 100 parts by mass of (A) the base polymer. The resin composition of the present embodiment contains (B) the metallic hydroxide, a content of which is equal to or more than 30 parts by mass and equal to or less than 150 parts by mass per 100 parts by mass of the base polymer.

As shown in FIG. 1, the insulated electric wire 10 according to the embodiment of the present invention includes the conductor 1 and the insulating layer 2 arranged in periphery of the conductor 1. The insulating layer 2 is made of the resin composition of the present embodiment.

Since the configuration as described above is applied in the present embodiment, the resin composition and the insulated electric wire, each of which has both the improved crush resistance in the uncross-linked state and the improved degree of cross linkage at the time of cross linkage can be provided. A reason for this will be specifically described below.

When the resin composition is made of a resin having a low melting point as described above in order to increase the degree of the cross linkage of the resin composition that has been cross-linked by the electron-beam irradiation method, the crush resistance of the insulating layer made of the resin composition decreases.

On the other hand, as the (A) base polymer, the resin composition according to the present embodiment contains (A1) the ethylene-vinyl acetate copolymer and (A2) the ethylene-(α-olefin) copolymer having the melting point that is equal or lower than 70° C. And, the resin composition of the present embodiment contains (A2) the ethylene-(α-olefin) copolymer having the melting point that is equal or lower than 70° C., a content of which is equal to or more than 20 parts by mass and equal to or less than 70 parts by mass per 100 parts by mass of (A) the base polymer.

In this manner, in the resin composition and the insulated electric wire having the resin composition as the insulating layer in the present embodiment, the crush resistance can be secured by (A1) the ethylene-vinyl acetate copolymer, and the degree of the cross linkage can be improved by (A2) the ethylene-(α-olefin) copolymer having the melting point that is equal or lower than 70° C. As a result, both the improved crush resistance in the uncross-linked state and the improved degree of the cross linkage at the time of cross linkage can be achieved.

The increase in the vinyl-acetate content (VA amount) of (A1) the ethylene-vinyl acetate copolymer can improve the degree of the cross linkage of the resin composition because of causing the decrease in the melting point of (A1) the ethylene-vinyl acetate copolymer, but undesirably decreases the electric insulation property of the resin composition because of causing the increase in the polarity of the ethylene-vinyl acetate copolymer. Regarding this point, in the resin composition according to the present embodiment, the "α-olefin" that is a raw material of (A2) the ethylene-(α-olefin) copolymer is the non-polarized monomer, and the vinyl-acetate total content of (A) the base polymer is equal to or less than 19 mass %. As described above, when the resin composition according to the present embodiment is configured so that the polarity of (A2) the ethylene-(α-olefin) copolymer is reduced and so that the vinyl-acetate total content of the entire (A) base polymer is controlled, the sufficient electric insulation property can be secured.

<Feature and Effect of Method of Manufacturing Insulated Electric Wire of Present Embodiment>

The method of manufacturing the insulated electric wire 10 according to the first embodiment of the present invention includes (a1) the step (kneading step) of forming the resin composition by kneading (A) the base polymer and (B) the metallic hydroxide, (b1) the step (insulating-layer coating step) of manufacturing the uncross-linked insulated electric wire 5 by extruding the resin composition so as to coat the periphery of the conductor 1 to form the insulating layer 2 as shown in FIG. 2, and (c1) the step (cross-linking step) of manufacturing the cross-linked insulated electric wire 10 shown in FIG. 1 by irradiating the uncross-linked insulated electric wire 5 with the electron beam to cross-link (A) the base polymer in the resin composition. In the first embodiment, the resin composition formed in the (a1) kneading step is the above-described resin composition of the present embodiment.

In the method of manufacturing the insulated electric wire 10 of the first embodiment, as described above, the crush resistance of the resin composition configuring the insulating layer 2 can be secured by (A1) the ethylene-vinyl acetate copolymer, and besides, the degree of the cross linkage thereof can be improved by (A2) the ethylene-(α-olefin) copolymer having the melting point that is equal to or lower than 70° C., and therefore, both the improvement of the crush resistance of the uncross-linked insulated electric wire 5 and the improvement of the degree of the cross linkage of the insulating layer 2 of the cross-linked insulated electric wire 10 can be achieved.

Particularly when the first embodiment includes (d) the step of reeling up the uncross-linked insulated electric wire 5 after (b1) the insulating-layer coating step as well as (c1) the cross-linking step, in other words, when the first embodiment includes a step of temporarily housing the manufactured uncross-linked insulated electric wire 5 so as to be reeled up on the drum 29, the surface of the uncross-linked insulated electric wire 5 can be prevented from being crushed at the contact between the insulated electric wires 5 in steps from (b1) the insulating-layer coating step to (c1) the cross-linking step to cause damage on the electric wires.

The second embodiment is different from the first embodiment in that the uncross-linked insulated electric wire 5 is irradiated with the electron beam in a cross-linking step (c2) without the reeling up of the uncross-linked insulated electric wire 5 shown in FIG. 2. Therefore, the second embodiment does not include a step of bringing the insulated electric wires 5 to be in contact with each other until the uncross-linked insulated electric wire 5 is irradiated with the electron beam, and therefore, the risk of occurrence of the defects due to the crush can be more reduced.

Each method of manufacturing the insulated electric wire 10 of the first and second embodiments preferably includes (f) a step (conductor heating step) of heating the conductor 1 at a temperature that is equal to or higher than the melting point of (A2) the ethylene-(α-olefin) copolymer as well as being equal to or lower than a setting temperature (die temperature: 160° C.) at the time of the extrusion of the resin composition in (a1) the kneading step.

Since the present embodiment includes (f) the conductor heating step before (b1) the insulating-layer coating step, the resin composition can be prevented from being rapidly cooled by the conductor 1 when the periphery of the conductor 1 is coated with the resin composition, and therefore, extrusion distortion is difficult to remain in the insulating layer 2 to be formed. This result can suppress the reduction in the elongation property of the resin composition configuring the insulating layer 2 and the shrinkage (so-called shrink back) of the insulating layer 2 at the time of the heating of the insulated electric wire 10.

Note that the heating temperature is preferably equal to or higher than the melting point of (A2) the ethylene-(α-olefin) copolymer having the lowest melting point in (A) the base polymer as well as being equal to or lower than a melting point of a material having the highest melting point in (A) the base polymer. In a viewpoint of prevention of the reduction in the temperature due to the air cooling on the conductor 1, (f) the conductor heating step is preferably performed immediately after (a1) the kneading step.

WORKING EXAMPLES

The present invention will be described in more details below on the basis of the working examples. However, the present invention is not limited to be applied to these working examples.

Each of insulated electric wires of working examples 1 to 20 and comparative examples 1 to 6 described below was configured as the insulated electric wire having the same configuration as that of the insulated electric wire 10 shown in FIG. 1, and corresponds to the one having a changed blend of the resin composition configuring the insulating layer 2. As the conductor 1, a tin-plated copper stranded wire (having an outer diameter of 3.1 mm and a cross-sectional area of 5.5 mm$^2$) was used. The insulating layer 2 in each of the working examples 1 to 10, the insulating layer 2 in each of the working examples 11 to 20 and the insulating layer 2 in each of the comparative examples 1 to 6 were made of resin compositions with blends shown in later-described tables 2, 3 and 4, respectively.

Raw Materials of Working Examples 1 to 20 and Comparative Examples 1 to 6

The raw materials for use in the working examples 1 to 20 and the comparative examples 1 to 6 are as shown in the later-described tables 2 to 4, and are only summarized below.

(A) Base Polymer:
(A1) Ethylene-Vinyl Acetate Copolymer:
(A11) Vinyl-Acetate Content (VA amount) 20 mass %
(A12) Vinyl-Acetate Content (VA amount) 33 mass %
(A2) Ethylene-(α-Olefin) Copolymer:
(A21) Ethylene-(1-Octene) Copolymer (melting point: 47° C.)
(A22) Ethylene-(1-Butene) Copolymer (melting point: 66° C.)
(A23) Ethylene-(1-Butene) Copolymer (melting point: 77° C.)
(A3) Other Polymer:
(A31) Polyethylene
(A32) Polypropylene
(B) Flame Retardant:
(B1) Aluminum Hydroxide:
(B11) Aluminum Hydroxide, a surface of which is treated with a fatty acid (abbreviated as "fatty-acid-treated" in the tables 2 to 4)
(B12) Aluminum Hydroxide, a surface of which is untreated (abbreviated as "untreated" in the tables 2 to 4)
(C) Cross-Linking Aid: Trimethylolpropane trimethacrylate
(D) Antioxidant:
(D1) Phenol-based Antioxidant
(D2) Sulfur-based Antioxidant
(E) Copper Inhibitor: Heavy metal deactivator
(F) Lubricant: Ethylene bis-oleic acid amide
(G) Colorant:
(G1) Carbon Black
(G2) (Yellow) Color Masterbatch
(G3) (Green) Color Masterbatch
(G4) (White) Color Masterbatch
(G5) (Red) Color Masterbatch
(G6) (Black) Color Masterbatch Manufacturing Methods of Working Examples 1 to 20 and Comparative Examples 1 to 6

Each sample of the working examples 1 to 20 and the comparative examples 1 to 6 was manufactured by the following method (corresponding to the method of manufacturing the insulated electric wire 10 of the first embodiment). In the table 1, note that the kneading condition of the single-screw extruder in each of the working examples 1 to 20 and the comparative examples 1 to 6 is summarized.

TABLE 1

| Classification | Item | Setting |
| --- | --- | --- |
| Extruder | Size | 65-mm single screw |
|  | L/D | 20 |
| Temperature (° C.) | Cylinder 1 (Hopper side) | 40 |
|  | Cylinder 2 | 140 |
|  | Cylinder 3 | 150 |
|  | Cylinder 4 | 155 |
|  | Cylinder 5 | 160 |
|  | Neck | 160 |
|  | Cross head | 160 |
|  | Die | 160 |
| Screw | Shape | Full fight type |
|  | Rotational speed (rpm) | 47 to 50 * |
| Reeling up | Reeling-up speed (m/min) | 50 |
| Conductor heating | Heating emperature (° C.) | 100 |

A compound was manufactured by kneading the raw materials of each of the working examples 1 to 20 and the comparative examples 1 to 6 shown in the later-described tables 2 to 4 in a kneader having an internal capacity of 25 L and was shaped into a pellet. The compound of the resin composition was extruded so as to coat the periphery of the conductor (tin-plated copper stranded wire) under the condition shown in the table 1 by using a single-screw extruder (corresponding to the extrusion coating apparatus 21 shown in FIG. 2) having a screw diameter of 65 mm, and an insulating layer having a coating thickness of about 1.1 mm was formed, so that the uncross-linked insulated electric wire (corresponding to the insulated electric wire 5 shown in FIG. 2) having a length of about several tens of meters was manufactured. In these cases of the working examples 1 to 15 and the comparative examples 1 to 6 (except for the working example 16), the conductor was heated at 100° C. (that is equal to or higher than the melting point of (A2) the ethylene-(α-olefin) copolymer as well as being equal to or lower than the setting temperature at the time of the extrusion). Each manufactured uncross-linked insulated electric wire was not reeled up on the drum but was collected by a coiler because of a short length.

Next, in the electron-beam irradiation apparatus, the collected uncross-linked insulated electric wire was irradiated with the electron beam (having an acceleration voltage of 2 MV and an electron-beam irradiance level of 10 Mrad), so that the cross-linked insulated electric wire (corresponding to the insulated electric wire 10 shown in FIG. 1) was manufactured.

Evaluating Method for Working Examples 1 to 20 and Comparative Examples 1 to 6

An evaluating method for the working examples 1 to 20 and the comparative examples 1 to 6 will be described below. Evaluated items (1) to (6) described below were comprehensively determined so that a sample that passed all the evaluated items was evaluated as "O" (passed) while a sample that failed even one item was evaluated as "X" (failed), and the samples were shown as judgment in the later-described tables 2 to 4.

(1) Crush Resistance (in Uncross-Linked State): Hardness

A hardness (durometer hardness) of a (uncross-linked) compound sheet that is press-shaped to have a thickness of 3 mm was measured, and the crush resistance of the surface of the uncross-linked insulated electric wire (corresponding to the uncross-linked insulated electric wire 5 reeled up on the drum 29 shown in FIG. 2) was evaluated. A type "A" was used as the durometer, and a reading value was read after 5 seconds from contact onto a double-layered sheet piece (having a total thickness of 6 mm). In this experiment, a type "D" of the durometer was not used even when the hardness is larger than 90, and the all measurements were made by the type A. Under an assumption that the long electric wire is reeled up on one drum, a sample having an A hardness that is equal to or larger than 84 was evaluated to be "O" (passed) as a sample having a sufficient crush resistance, a sample having an A hardness that is equal to or larger than 80 and smaller than 84 was evaluated to be "Δ" (passed) as a sample possibly no having a problem in product appearance although still having a crush possibility depending on manufacturing conditions such as an electric wire size, a reeling-up tension, a weight of the reeled-up electric wire or others, and a sample having an A hardness that is smaller than 80 was evaluated to be "X" (failed) as a sample having an insufficient crush resistance.

(2) Degree of Cross Linkage: Gel Fraction

A columnar insulating layer that was peeled off from the electric wire after the electron-beam irradiation and that was cut to have a width of about 1 mm was measured and sampled so as to have a weight of about 0.5 g (as a prepared sample). This sample was covered by a brass-made wire mesh having 40 mesh (having an opening of about 0.4 mm), was subject to an extraction process using xylene for 24 hours in an oil bath of 110° C., was stood in natural dry for one night, and then, was subject to vacuum dry for 4 hours at 80° C., so that an extracted/dried sample was obtained. A gel fraction was calculated by using the following expression 1. Note that the aluminum hydroxide was handled as a polymer gel to be a xylene insoluble component that is not calculated as a gel component. A sample having a gel fraction that is equal to or higher than 84% was evaluated to be "O" (passed) as a sample having a sufficient degree of the cross linkage, a sample having a gel fraction that is equal to or higher than 82% and lower than 84% was evaluated to be "Δ" (passed) as a sample possibly no having a problem in application to the insulating layer of the general-purpose electric wire although possibly being limited in partial application (having necessity of extremely high heat resistance or others), and a sample having a gel fraction that is lower than 82% was evaluated to be "X" (failed) as a sample having an insufficient degree of the cross linkage.

$$G=(b-a\times(z/x))/(a\times(y/x))\times 100 \quad \text{(Expression 1)}$$

(G: Gel fraction [%], a: test sample weight [g], b: extracted/dried sample weight [g], x: resin-composition total blend amount [parts by mass], y: base-polymer blend amount [parts by mass], z: aluminum-hydroxide blend amount [parts by mass])

(3) Flexibility: Tensile Strength in 100% Elongation

The conductor was pulled out of the electric wire that has been irradiated with the electron beam, and was cut to have a length of 150 mm, so that a tubular test piece having gauge lines with a 50-mm gap therebtween at a center was prepared. A tensile load was measured at the time of 100% elongation between the gauge lines of this tubular test piece under a condition of a tensile speed of 200 mm/min., by using a Schopper tensile strength tester, and a tensile strength was calculated from the following expression 2. A sample having a tensile strength in 100% elongation that is smaller than 4.0 MPa was evaluated to be "O" (passed) as a sample having sufficient flexibility, a sample having a tensile strength that is equal to or larger than 4.0 MPa and smaller than 6.0 MPa was evaluated to be "Δ", as a sample possibly having no practical problem in, for example, wiring operation or others, and a sample having a tensile strength that is larger than 6.0 MPa was evaluated to be "X" (failed)

as a sample having insufficient flexibility. Note that a cross-sectional area "A" of the test piece was obtained by measuring an outer diameter of the insulated electric wire at three points by using a micrometer and using the expression 2 taking the minimum value "D" of the measured outer diameters and a conductor outer diameter "d" as shown in Japanese Industrial Standards JIS C3005 (2014), 4.16.1.3 (a-1).

$$A=\pi(D^2-d^2)/4 \quad \text{(Expression 2)}$$

$\delta=F/A$ ($\delta$: tensile strength [MPa], $F$: tensile load [N], $A$: test-piece cross-sectional area [mm$^2$]) (Expression 2)

(4) Tensile Property: Elongation

The elongation at the time of fracture was measured in a tensile test using the tubular test piece under the same conditions as those of the above-described flexibility evaluation. A sample having elongation that is equal to or higher than 400% was evaluated to be "O" (passed) as a sample having a sufficient tensile property, a sample having elongation that is equal to or higher than 200% and lower than 400% was evaluated to be "Δ" (passed) as a sample that is almost available without any problem although possibly being limited in partial application depending on applied standards, and a sample having a tensile strength that is lower than 200% was evaluated to be "X" (failed) as a sample having insufficient tensile property.

(5) Electric Insulation Property: Volume Resistivity

The above-described compound was shaped into a sheet piece having a thickness of 1 mm by using a thermal pressing machine at 160° C. This sheet piece was irradiated with the electron beams having the same condition (an acceleration voltage of 2 MV and an electron-beam irradiance level of 10 Mrad) as that of the electric-wire cross-linking step by using the electron-beam irradiation apparatus, so that a cross-linked sheet piece was manufactured. Then, a volume resistivity of this cross-linked sheet piece was obtained from a current value obtained after application of DC 500 V at a room temperature (23° C.) for 1 minute by using an ultra-high insulation resistance meter R8340A (produced by ADVANTEST corporation). A sample having a volume resistivity that is equal to or larger than $2.0 \times 10^{14}$ Ω·cm was evaluated to be "O" (passed) as a sample having a sufficient insulation property, a sample having a volume resistivity that is equal to or larger than $1.0 \times 10^{14}$ Ω·cm and smaller than $2.0 \times 10^{14}$ Ω·cm was evaluated to be "Δ" (passed) as a sample almost being available as the insulator without any problem if not required to have a high insulation property, and a sample having a volume resistivity that is smaller than $1.0 \times 10^{14}$ Ω·cm was evaluated to be "X" (failed) as a sample having an insufficient insulation property.

(6) Flame Retardancy: Oxygen Index

The above-described compound was shaped into a sheet piece having a thickness of 3 mm by using a thermal pressing machine at 160° C. This sheet piece was irradiated with the electron beams having the same condition (an acceleration voltage of 2 MV and an electron-beam irradiance level of 10 Mrad) as that of the electric-wire cross-linking step by using the electron-beam irradiation apparatus, so that a cross-linked sheet piece was manufactured. Then, an oxygen index of this cross-linked sheet piece was measured in a method shown in JIS K7201-2 (2007) by using an OXYGEN INDEXER (produced by Toyo Seiki Seisaku-sho, Ltd.). A sample having an oxygen index that is equal to or larger than 23 was evaluated to be "O" (passed) as a sample having a sufficient flame retardancy, a sample having an oxygen index that is equal to or larger than 21 and smaller than 23 was evaluated to be "Δ" (passed) as a sample almost being available without any problem if not required to have a high flame retardancy, and a sample having an oxygen index that is smaller than 21 was evaluated to be "X" (failed) as a sample having an insufficient flame retardancy.

Evaluation Results of Working Examples 1 to 20 and Comparative Examples 1 to 6

Evaluation results based on the above-described evaluation methods are summarized in the tables 2 to 4.

TABLE 2

| Blend | | | | Working example 1 | Working example 2 | Working example 3 | Working example 4 | Working example 5 | Working example 6 | Working example 7 | Working example 8 | Working example 9 | Working example 10 |
|---|---|---|---|---|---|---|---|---|---|---|---|---|---|
| Coating material configuration (Parts by mass) | (A) Base polymer | (A1) Ethyene-vinyl acetate copoymer | (A11) VA amount 20 wt % *1 | 80 | 70 | 50 | 30 | 50 | 50 | 40 | 40 | 50 | 50 |
| | | | (A12) VA amount 33 wt % *2 | | | | | | | 20 | | | |
| | | (A2) Ethylene-(α-olefin) copolymer | (A21) Ethylene-(1-ocetene) copolymer *3 | 20 | 30 | 50 | 70 | | 30 | 50 | 50 | 50 | 50 |
| | | | (A22) Ethylene-(1-butene) copolymer *4 | | | | | 50 | | | | | |
| | | | (A23) Ethylene-(1-butene) copolymer *5 | | | | | | | | | | |
| | (A3) Other polymer | | (A31) Polypropylene *6 | | | | | | | | 10 | | |
| | | | (A32) Polyethylene *7 | | | | | | | | | | 10 |
| (B) Flame retardant (Metallic hydroxide) | (B1) Aluminum hydroxide | (B11) Fatty-acid treated *8 | | 70 | 70 | 70 | 70 | 70 | 70 | 70 | 70 | 30 | 50 |
| | | (B12) Untreated *9 | | | | | | | | | | | |

TABLE 2-continued

| | Blend | | Working example 1 | Working example 2 | Working example 3 | Working example 4 | Working example 5 | Working example 6 | Working example 7 | Working example 8 | Working example 9 | Working example 10 |
|---|---|---|---|---|---|---|---|---|---|---|---|---|
| Other components | (C) Cross linking aid | Trimethylolpropane trimethacrylate *10 | 2 | 2 | 2 | 2 | 2 | 2 | 2 | 2 | 2 | 2 |
| | (D) Antioxidant | (D1) Phenol-based antioxdant *11 | 0.5 | 0.5 | 0.5 | 0.5 | 0.5 | 0.5 | 0.5 | 0.5 | 0.5 | 0.5 |
| | | (D2) Sulfur-based antioxidant *12 | 1 | 1 | 1 | 1 | 1 | 1 | 1 | 1 | 1 | 1 |
| | (E) Copper inhibitor | Heavy metal deactivator *13 | 0.5 | 0.5 | 0.5 | 0.5 | 0.5 | 0.5 | 0.5 | 0.5 | 0.5 | 0.5 |
| | (F) Lubricant | Ethylene bis-oleic acid amide *14 | 1 | 1 | 1 | 1 | 1 | 1 | 1 | 1 | 1 | 1 |
| | (G) Colorant | (G1) Carbon black *15 | 5 | 5 | 5 | 5 | 5 | 5 | 5 | 5 | 5 | 5 |
| | | (G2) (Yellow) color masterbatch *16 | | | | | | | | | | |
| | | (G3) (Green) color masterbatch *17 | | | | | | | | | | |
| Blend ratio | Vinyl-acetate content of (A) Base polymer (mass %) | | 16 | 14 | 10 | 6 | 10 | 16.6 | 8 | 8 | 10 | 10 |
| Electric-wire maufacturing step | Conductor heating | | Done | Done | Done | Done | Done | Done | Done | Done | Done | Done |
| Evaluation | Property (1) Crush resistance (Uncrosslinked state) | Hardness (Shore A) | ○(91) | ○(89) | ○(85) | Δ(81) | ○(86) | ○(87) | ○(91) | ○(90) | Δ(83) | ○(84) |
| | (2) Degree of cross linkage | Gel fraction (%) | Δ(83.0) | ○(85.5) | ○(86.9) | ○(89.2) | ○(86.6) | ○(85.9) | ○(85.4) | ○(85.2) | ○(86.6) | ○(86.7) |
| | (3) Flexibility | 100% Modulus (Mpa) | Δ(4.1) | ○(3.5) | ○(3.1) | ○(2.6) | ○(3.3) | ○(3.2) | Δ(4.9) | Δ(4.7) | ○(2.6) | ○(2.9) |
| | (4) Tensile property | Elongation (%) | Δ(380) | ○(460) | ○(510) | ○(560) | ○(480) | ○(480) | Δ(340) | Δ(360) | ○(540) | ○(530) |
| | (5) Electric insulation property | Volume resistivity ($\times 10^{14}$ Ω·cm) | ○(2.1) | ○(2.7) | ○(3.9) | ○(5.4) | ○(3.9) | Δ(1.9) | ○(5.1) | ○(5.0) | ○(7.6) | ○(5.2) |
| | (6) Flame retardancy | Oxygen index | ○(23.8) | ○(23.9) | ○(23.7) | ○(23.6) | ○(23.4) | ○(24.0) | ○(23.2) | ○(23.3) | ○(21.9) | ○(23.1) |
| | Determination | | ○ | ○ | ○ | ○ | ○ | ○ | ○ | ○ | ○ | ○ |

*1 MFR (g/10 min@190° C., 2.16 kgf): 1.0, Melting point: 85° C., VF120T produced by Ube-Maruzen Polyethylene Co., Ltd.
*2 MFR (g/10 min@190° C., 2.16 kgf): 1.0, Melting point: 62° C., EV170 produced byDuPont-Mitsui Polychemicals Co., Ltd.
*3 MFR (g/10 min@190° C., 2.16 kgf): 0.5, Melting point: 47° C., Engage8180 produced by DuPont Dow Elastomers L.L.C.
*4 MFR (g/10 min@190° C., 2.16 kgf): 3.6, Melting point: 66° C., TAFMAR DF840 produced by Mitsui Chemicals, Inc.
*5 MFR (g/10 min@190° C., 2.16 kgf): 3.6, Melting point: 77° C., TAFMAR DF940 produced by Mitsui Chemicals, Inc.
*6 Random polymerized polypropylene, B241 produced by Prime Polymer Co., Ltd.
*7 Low-density polyethylene, UBE C540 produced by Ube-Maruzen Polyethylene Co., Ltd.
*8 BF-013 S produced by Nippon Light Metal Company, Ltd.
*9 BF-013 produced by Nippon Light Metal Company, Ltd.
*10 produced by Shin Nakamura Chemical Co., Ltd.
*11 Hindered phenol-based primary antioxidant produced by ADEKA Corporation
*12 Sulfur-based secondary antioxidant produced by ADEKA Corporation
*13 produced by ADEKA Corporation
*14 Crodamide EBO, produced by CRODA International Plc.
*15 Asahi thermal carbon produced by Asahi Carbon Co., Ltd.
*16 Masterbatch blended with Condensed Azo-base Pigment produced by Dainichiseika Color & Chemicals Mfg. Co., Ltd.
*17 Masterbatch blended with Mixture of Phthalocyanine-blue- and Mono-Azo-Yellow-base Pigments produced by Dainichiseika Color & Chemicals Mfg. Co., Ltd.

TABLE 3

| | Blend | | | Working example 11 | Working example 12 | Working example 13 | Working example 14 | Working example 15 | Working example 16 | Working example 17 | Working example 18 | Working example 19 | Working example 20 |
|---|---|---|---|---|---|---|---|---|---|---|---|---|---|
| Coating material config- | (A) Base polymer | (A1) Ethyene-vinyl | (A11) VA amount 20 wt % *1 | 50 | 50 | 50 | 50 | 50 | 50 | 50 | 50 | 50 | 50 |

TABLE 3-continued

| | Blend | | Working example 11 | Working example 12 | Working example 13 | Working example 14 | Working example 15 | Working example 16 | Working example 17 | Working example 18 | Working example 19 | Working example 20 |
|---|---|---|---|---|---|---|---|---|---|---|---|---|
| uration (Parts by mass) | acetate copoymer | (A12) VA amount 33 wt % *2 | | | | | | | | | | |
| | (A2) Ethylene- (α-olefin) copolymer | (A21) Ethylene- (1-ocetene) copolymer *3 | 50 | 50 | 50 | 50 | 50 | 50 | 50 | 50 | 50 | 50 |
| | | (A22) Ethylene- (1-butene) copolymer *4 | | | | | | | | | | |
| | | (A23) Ethylene- (1-butene) copolymer *5 | | | | | | | | | | |
| | (A3) Other polymer | (A31) Polypropylene *6 | | | | | | | | | | |
| | | (A32) Polyethylene *7 | | | | | | | | | | |
| (B) Flame retardant (Metallic hydroxide) | (B1) Alumnum hydroxide | (B11) Fatty- acid treated *8 | 100 | 150 | | 70 | 70 | 70 | 70 | 70 | 70 | 70 |
| | | (B12) Untreated *9 | | | 70 | | | | | | | |
| Other compo- nents | (C) Cross linking aid | Trimethyl- olpropane trimethacrylate *10 | 2 | 2 | 2 | 2 | 2 | 2 | 2 | 2 | 2 | 2 |
| | (D) Antioxidant | (D1) Phenol- based antioxdant *11 | 0.5 | 0.5 | 0.5 | 0.5 | 0.5 | 0.5 | 0.5 | 0.5 | 0.5 | 0.5 |
| | | (D2) Sulfur- based antioxidant *12 | 1 | 1 | 1 | 1 | 1 | 1 | 1 | 1 | 1 | 1 |
| | (E) Copper inhibitor | Heavy metal deactivator *13 | 0.5 | 0.5 | 0.5 | 0.5 | 0.5 | 0.5 | 0.5 | 0.5 | 0.5 | 0.5 |
| | (F) Lubricant | Ethylene bis- oleic acid amide *14 | 1 | 1 | 1 | 1 | 1 | 1 | 1 | 1 | 1 | 1 |
| | (G) Colorant | (G1) Carbon black *15 | 5 | 5 | 5 | | | 5 | | | | |
| | | (G2) (Yellow) color masterbatch *16 | | | | 5 | | | | | | |
| | | (G3) (Green) color masterbatch *17 | | | | | 5 | | | | | |
| | | (G4) (White) color masterbatch *18 | | | | | | | | 5 | | |
| | | (G5) (Red) color masterbatch *19 | | | | | | | | | 5 | |
| | | (G6) (Black) color masterbatch *20 | | | | | | | | | | 5 |
| | Blend Ratio | Vinyl-acetate content of (A) Base polymer (mass %) | 10 | 10 | 10 | 10 | 10 | 10 | 10 | 10 | 10 | 10 |
| Electric-wire maufacturing step | | Conductor heating | Done | Done | Done | Done | Done | Not Done | Done | Done | Done | Done |
| Evalu- ation | Property | (1) Crush resistance (Uncross- | Hardness (Shore A) | ○(88) | ○(93) | ○(83) | ○(84) | ○(85) | ○(86) | ○(83) | ○(86) | ○(84) | ○(86) |

TABLE 3-continued

| Blend | | Working example 11 | Working example 12 | Working example 13 | Working example 14 | Working example 15 | Working example 16 | Working example 17 | Working example 18 | Working example 19 | Working example 20 |
|---|---|---|---|---|---|---|---|---|---|---|---|
| | linked state) | | | | | | | | | | |
| (2) Degree of cross linkage | Gel fraction (%) | ○(96.4) | ○(86.8) | ○(86.8) | ○(86.7) | ○(87.0) | ○(86.5) | ○(86.5) | ○(87.1) | ○(86.6) | ○(87.2) |
| (3) Flexibility | 100% Modulus (Mpa) | ○(3.9) | △(4.8) | ○(2.9) | ○(2.9) | ○(3.0) | ○(3.6) | ○(2.8) | ○(3.2) | ○(3.0) | ○(3.3) |
| (4) Tensile property | Elongation (%) | ○(420) | △(290) | ○(470) | ○(510) | ○(500) | △(390) | ○(520) | ○(480) | ○(520) | ○(490) |
| (5) Electric insulation property | Volume resistivity (×10$^{14}$ Ω·cm) | ○(2.2) | △(1.5) | ○(3.8) | ○(3.6) | ○(3.9) | ○(3.8) | ○(4.2) | ○(3.4) | ○(3.8) | ○(3.9) |
| (6) Flame retardancy | Oxygen index | ○(24.9) | ○(26.3) | △(22.8) | ○(23.5) | ○(23.8) | ○(23.9) | ○(23.4) | ○(24.1) | ○(23.7) | ○(23.8) |
| | Determination | ○ | ○ | ○ | ○ | ○ | ○ | ○ | ○ | ○ | ○ |

*1 MFR (g/10 min@190° C., 2.16 kgf): 1.0, Melting point: 85° C., VF120T produced by Ube-Maruzen Polyethylene Co., Ltd.
*2 MFR (g/10 min@190° C., 2.16 kgf): 1.0, Melting point: 62° C., EV170 produced by DuPont-Mitsui Polychemicals Co., Ltd.
*3 MFR (g/10 min@190° C., 2.16 kgf): 0.5, Melting point: 47° C., Engage8180 produced by DuPont Dow Elastomers L.L.C.
*4 MFR (g/10 min@190° C., 2.16 kgf): 3.6, Melting point: 66° C., TAFMAR DF840 produced by Mitsui Chemicals, Inc.
*5 MFR (g/10 min@190° C., 2.16 kgf): 3.6, Melting point: 77° C., TAFMAR DF940 produced by Mitsui Chemicals, Inc.
*6 Random polymerized polypropylene, B241 produced by Prime Polymer Co., Ltd.
*7 Low-density polyethylene, UBE C540 produced by Ube-Maruzen Polyethylene Co., Ltd.
*8 BF-013 S produced by Nippon Light Metal Company, Ltd.
*9 BF-013 produced by Nippon Light Metal Company, Ltd.
*10 produced by Shin Nakamura Chemical Co., Ltd.
*11 Hindered phenol-based primary antioxidant produced by ADEKA Corporation
*12 Sulfur-based secondary antioxidant produced by ADEKA Corporation
*13 produced by ADEKA Corporation
*14 Crodamide EBO, produced by CRODA International Plc.
*15 Asahi thermal carbon produced by Asahi Carbon Co., Ltd.
*16 Masterbatch blended with Condensed Azo-base Pigment produced by Dainichiseika Color & Chemicals Mfg. Co., Ltd.
*17 Masterbatch blended with Mixture of Phthalocyanine-blue- and Mono-Azo-Yellow-base Pigments produced by Dainichiseika Color & Chemicals Mfg. Co., Ltd.
*18 Masterbatch blended with Titanium oxide produced by Dainichiseika Color & Chemicals Mfg. Co., Ltd.
*19 Masterbatch blended with Mono-Azo-Red- and Quinacridone-Red-base Pigment, produced by Dainichiseika Color & Chemicals Mfg. Co., Ltd.
*20 Masterbatch blended with Carbon Black produced by Toyo Ink Co., Ltd.

TABLE 4

| Blend | | | | Comparative example 1 | Comparative example 2 | Comparative example 3 | Comparative example 4 | Comparative example 5 | Comparative example 6 |
|---|---|---|---|---|---|---|---|---|---|
| Coating material configuration (Parts by mass) | (A) Base polymer | (A1) Ethyene-vinyl acetate copoymer | (A11) VA amount 20 wt % *1 | 90 | 20 | 50 | 50 | 50 | 30 |
| | | | (A12) VA amount 33 wt % *2 | | | | | | 40 |
| | | (A2) Ethylene-(α-olefin) copolymer | (A21) Ethylene-(1-ocetene) copolymer *3 | 10 | 80 | 50 | | 50 | 30 |
| | | | (A22) Ethylene-(1-butene) copolymer *4 | | | | | | |
| | | | (A23) Ethylene-(1-butene) copolymer *5 | | | | 50 | | |
| | | (A3) Other polymer | (A31) Polypropylene *6 | | | | | | |
| | | | (A32) Polyethylene *7 | | | | | | |
| | (B) Flame retardant (Metallic hydroxide) | (B1) Aluminum hydroxide | (B11) Fatty-acid treated *8 | 70 | 70 | 70 | 20 | 180 | 70 |
| | | | (B12) Untreated *9 | | | | | | |
| | Other components | (C) Cross linking aid | Trimethylolpropane trimethacrylate *10 | 2 | 2 | 2 | 2 | 2 | 2 |
| | | (D) Antioxidant | (D1) Phenol-based antioxdant *11 | 0.5 | 0.5 | 0.5 | 0.5 | 0.5 | 0.5 |
| | | | (D2) Sulfur-based antioxidant *12 | 1 | 1 | 1 | 1 | 1 | 1 |
| | | (E) Copper inhibitor | Heavy metal deactivator *13 | 0.5 | 0.5 | 0.5 | 0.5 | 0.5 | 0.5 |
| | | (F) Lubricant | Ethylene bis-oleic acid amide *14 | 1 | 1 | 1 | 1 | 1 | 1 |

TABLE 4-continued

|  |  | Blend |  | Comparative example 1 | Comparative example 2 | Comparative example 3 | Comparative example 4 | Comparative example 5 | Comparative example 6 |
|---|---|---|---|---|---|---|---|---|---|
|  |  | (G) Colorant | (G1) Carbon black *15 | 5 | 5 | 5 | 5 | 5 | 5 |
|  |  |  | (G2) (Yellow) color masterbatch *16 |  |  |  |  |  |  |
|  |  |  | (G3) (Green) color masterbatch *17 |  |  |  |  |  |  |
|  | Blend ratio | Vinyl-acetate content of (A) Base polymer (mass %) |  | 18 | 4 | 10 | 10 | 10 | 19.2 |
|  | Electric-wire maufacturing step | Conductor heating |  | Done | Done | Done | Done | Done | Done |
| Evaluation | Property | (1) Crush resistance (Uncross-linked state) | Hardness (Shore A) | ○(93) | x(78) | ○(89) | Δ(82) | ○(95) | ○(83) |
|  |  | (2) Degree of cross linkage | Gel fraction (%) | x(80.9) | ○(90.6) | x(81.8) | ○(86.2) | ○(86.7) | ○(86.3) |
|  |  | (3) Flexibility | 100% Modulus (Mpa) | Δ(4.4) | ○(2.3) | ○(3.5) | ○(2.5) | Δ(5.6) | ○(2.9) |
|  |  | (4) Tensile property | Elongation (%) | Δ(340) | ○(570) | ○(440) | ○(560) | x(190) | ○(510) |
|  |  | (5) Electric insulation property | Volume resistivity ($\times 10^{14}\ \Omega \cdot cm$) | Δ(1.2) | ○(6.5) | ○(3.8) | ○(9.2) | x(0.9) | x(0.3) |
|  |  | (6) Flame retardancy | Oxygen index | ○(24.2) | ○(23.3) | ○(23.8) | x(20.6) | ○(28.2) | ○(24.3) |
|  |  | Determination |  | x | x | x | x | x | x |

*1 MFR (g/10 min@190° C., 2.16 kgf): 1.0, Melting point: 85° C., VF120T produced by Ube-Maruzen Polyethylene Co., Ltd.
*2 MFR (g/10 min@190° C., 2.16 kgf): 1.0, Melting point: 62° C., EV170 produced byDuPont-Mitsui Polychemicals Co., Ltd.
*3 MFR (g/10 min@190° C., 2.16 kgf): 0.5, Melting point: 47° C., Engage8180 produced by DuPont Dow Elastomers L.L.C.
*4 MFR (g/10 min@190° C., 2.16 kgf): 3.6, Melting point: 66° C., TAFMAR DF840 produced by Mitsui Chemicals, Inc.
*5 MFR (g/10 min@190° C., 2.16 kgf): 3.6, Melting point: 77° C., TAFMAR DF940 produced by Mitsui Chemicals, Inc.
*6 Random polymerized polypropylene, B241 produced by Prime Polymer Co., Ltd.
*7 Low-density polyethylene, UBE C540 produced by Ube-Maruzen Polyethylene Co., Ltd.
*8 BF-013 S produced by Nippon Light Metal Company, Ltd.
*9 BF-013 produced by Nippon Light Metal Company, Ltd.
*10 produced by Shin Nakamura Chemical Co., Ltd.
*11 Hindered phenol-based primary antioxidant produced by ADEKA Corporation
*12 Sulfur-based secondary antioxidant produced by ADEKA Corporation
*13 produced by ADEKA Corporation
*14 Crodamide EBO, produced by CRODA International Plc.
*15 Asahi thermal carbon produced by Asahi Carbon Co., Ltd.
*16 Masterbatch blended with Condensed Azo-base Pigment produced by Dainichiseika Color & Chemicals Mfg. Co., Ltd.
*17 Masterbatch blended with Mixture of Phthalocyanine-blue- and Mono-Azo-Yellow-base Pigments produced by Dainichiseika Color & Chemicals Mfg. Co., Ltd.

As shown in the tables 2 and 3, the working examples 1 to 20 passed all (1) the crush resistance, (2) the degree of the cross linkage, (3) the flexibility, (4) the tensile property, (5) the electric insulation property and (6) the flame retardancy, and were evaluated as "O" (passed). On the other hand, as shown in the table 4, the comparative examples 1 to 6 were evaluated as "X" (failed). Specifically, the comparative example 2 failed (1) the crush resistance, the comparative examples 1 and 3 failed (2) the degree of the cross linkage, the comparative example 5 failed (4) the tensile property and (5) the electric insulation property, the comparative example 6 failed (5) the electric insulation property, and the comparative example 4 failed (6) the flame retardancy.

In each resin composition of the working examples 1 to 20, (A) the base polymer contains at least (A1) the ethylene-vinyl acetate copolymer and (A2) the ethylene-(α-olefin) copolymer having the melting point that is equal to or lower than 70° C., the "α-olefin" that is the raw material of the ethylene-(α-olefin) copolymer is a non-polarized monomer, and the vinyl-acetate total content of (A) the base polymer is equal to or less than 19 mass %. Each resin composition of the working examples 1 to 16 contains (A2) the ethylene-(α-olefin) copolymer, a content of which is equal to or more than 20 parts by mass and equal to or less than 70 parts by mass per 100 parts by mass of (A) the base polymer, and contains (B) the metallic hydroxide, a content of which is equal to or more than 30 parts by mass and equal to or less than 150 parts by mass per 100 parts by mass of the base polymer. In this manner, it has been found that both the improvement in the crush resistance in the uncrossed-link state and the improvement in the degree of cross linkage can be achieved.

More specifically, as shown in the working examples 1 to 4, in a viewpoint of both achievement in the degree of cross linkage and the crush resistance, it is necessary that the resin composition should contain (A2) the ethylene-(α-olefin) copolymer, a content of which is equal to or more than 20 parts by mass and equal to or less than 70 parts by mass per 100 parts by mass of (A) the base polymer, and it is more preferable that the resin composition should contain (A2) the ethylene-(α-olefin) copolymer, a content of which is equal to or more than 30 parts by mass and equal to or less than 50 parts by mass per 100 parts by mass of (A) the base polymer.

On the other hand, as shown in the comparative example 1, when the resin composition contains (A2) the ethylene-(α-olefin) copolymer having the melting point that is equal to or lower than 70° C., a content of which is 10 parts by mass per 100 parts by mass of (A) the base polymer, it has been found that (2) the degree of cross linkage is insufficient. From this result, it has been found that the excessive reduction in the ratio of (A2) the ethylene-(α-olefin) copolymer having a relatively large polymer molecular motion at the time of the electron-beam irradiation is difficult to form the cross-linkage structure.

As shown in the comparative example 2, when the resin composition contains (A2) the ethylene-(α-olefin) copolymer having the melting point that is equal to or lower than 70° C., a content of which is 80 parts by mass per 100 parts by mass of (A) the base polymer, the material hardness of the uncross-linked insulating layer (before the electron-beam irradiation) becomes 78 that is small in a term of the "A" hardness, and therefore, it is concerned that the electric wire surface is crushed in the reeling up on the drum at the time of the electric wire manufacturing.

As shown in the working examples 3, 5 and 6, when the melting point of (A2) the ethylene-(α-olefin) copolymer is equal to or lower than 70° C., it has been found that desirable properties appear. Particularly, as shown in the working examples 3, 5 and 6, the "α-olefin" that is the raw material of (A2) the ethylene-(α-olefin) copolymer is important to be the non-polarized monomer.

As shown in the comparative example 3, when the melting point of (A2) the ethylene-(α-olefin) copolymer is higher than 70° C., it has been found that the degree of cross linkage is insufficient even in a blend with a suitable amount. From this result, it has been found that the melting point of the blended polymer is important in the cross linkage based on the electron-beam irradiation method.

As shown in the comparative example 6, when the vinyl-acetate total content of (A) the base polymer is more than 19 mass %, it has been found that (5) the electric insulation property is reduced.

As shown in the working examples 3 and 9 to 12, in a viewpoint of achievement of all the flame retardancy, the tensile property and the electric insulation property, it is necessary that the resin composition should contain (B) the metallic hydroxide, a content of which is equal to or more than 30 parts by mass and equal to or less than 150 parts by mass per 100 parts by mass of (A) the base polymer, and it is more preferable that the resin composition should contain (B) the metallic hydroxide, a content of which is equal to or more than 50 parts by mass and equal to or less than 100 parts by mass per 100 parts by mass of (A) the base polymer.

On the other hand, as shown in the comparative example 4, it has been found that the decrease in the content of (B) the metallic hydroxide down to 20 parts by mass per 100 parts by mass of (A) the base polymer undesirably reduces (6) the flame retardancy. As shown in the comparative example 5, it has been found that the increase in the content of (B) the metallic hydroxide up to 180 parts by mass per 100 parts by mass of (A) the base polymer undesirably reduces (4) the tensile property and (5) the electric insulation property.

As shown in the working examples 7 and 8, it has been found that the crush resistance is improved by the addition of the polypropylene or the polyethylene as (A3) the other polymer to (A) the base polymer.

As shown in the working examples 13 to 15 and 17 to 20, it has been found that the insulated electric wire having the excellent crush resistance in the uncross-linked state, flame retardancy and flexibility can be manufactured at least when the hue of the insulating layer of the insulated electric wire is black, white, red, yellow or green, without the blend change except in (G) the colorant regardless of the type of (G) the colorant.

As shown in the working examples 3 and 16, it has been found that, when the conductor heating step is performed although regardless of whether or not the conductor heating step exists in the formation of the insulating layer, the remaining distortion in the extrusion is reduced since the rapid cooling of the insulating layer at the time of the extrusion is moderated, which results in the improvement in the tensile property (elongation).

The present invention is not limited to the foregoing embodiments and working examples, and various alterations can be made within the scope of the present invention.

What is claimed is:

1. A resin composition comprising:
   a base polymer; and
   a metallic hydroxide,
   wherein the base polymer contains at least ethylene-vinyl acetate copolymer and ethylene-(α-olefin) copolymer,
   the α-olefin that is a raw material of the ethylene-(α-olefin) copolymer is a non-polarized monomer,
   a melting point of the ethylene-(α-olefin) copolymer is equal to or lower than 70° C.,
   a vinyl-acetate total content of the base polymer is equal to or less than 19 mass %,
   the resin composition contains the ethylene-(α-olefin) copolymer, a content of which is equal to or more than 20 parts by mass and equal to or less than 70 parts by mass per 100 parts by mass of the base polymer, and
   the resin composition contains the metallic hydroxide, a content of which is equal to or more than 30 parts by mass and equal to or less than 150 parts by mass per 100 parts by mass of the base polymer.

2. The resin composition according to claim 1,
   wherein the metallic hydroxide is aluminum hydroxide.

3. The resin composition according to claim 2,
   wherein a surface of the aluminum hydroxide is treated with a fatty acid.

4. The resin composition according to claim 2,
   wherein the resin composition contains the aluminum hydroxide, a content of which is equal to or more than 50 parts by mass and equal to or less than 100 parts by mass per 100 parts by mass of the base polymer.

5. The resin composition according to claim 1,
   wherein the α-olefin is 1-butene or 1-octene.

6. The resin composition according to claim 1,
   wherein the resin composition contains the ethylene-(α-olefin) copolymer, a content of which is equal to or more than 30 parts by mass and equal to or less than 50 parts by mass per 100 parts by mass of the base polymer.

7. The resin composition according to claim 1,
   wherein the resin composition further contains a black pigment, a white pigment, a red pigment, a yellow pigment or a green pigment.

8. An insulated electric wire comprising an insulating layer made of the resin composition according to claim 1.

9. The insulated electric wire according to claim 8,
   wherein the resin composition further contains a heavy metal deactivator, and
   the insulating layer is in contact with the conductor.

10. The insulated electric wire according to claim 8,
    wherein the insulated electric wire is used as an in-board wiring of a distribution board or a control board or as a motor lead wire.

11. A cable comprising a sheath layer made of the resin composition according to claim 1.

12. A method of manufacturing an insulated electric wire comprising the steps of:
    (a) forming a resin composition by kneading a base polymer and a metallic hydroxide;
    (b) a step of manufacturing an uncross-linked insulated electric wire by extruding the resin composition so as to coat periphery of a conductor to form an insulating layer; and (c) a step of manufacturing a cross-linked insulated electric wire by irradiating the uncross-linked insulated electric wire with electron beam to cross-link the base polymer in the resin composition, wherein the base polymer contains at least ethylene-vinyl acetate copolymer and ethylene-(α-olefin) copolymer, the α-olefin that is a raw material of the ethylene-(α-olefin) copolymer is a non-polarized monomer, a melting point of the ethylene-(α-olefin) copolymer is equal to or lower than 70° C., a vinyl-acetate total content of the base polymer is equal to or less than 19 mass %, the resin composition contains the ethylene-(α-olefin) copolymer, a content of which is equal to or more than 20 parts by mass and equal to or less than 70 parts by mass per 100 parts by mass of the base polymer, and the resin composition contains the metallic hydroxide, a content of which is equal to or more than 30 parts by mass and equal to or less than 150 parts by mass per 100 parts by mass of the base polymer.

13. The method of manufacturing the insulated electric wire according to claim 12 further comprising the step of, after the step (b) and before the step (c):

(d) reeling up the uncross-linked insulated electric wire.

* * * * *